United States Patent [19]
Ogiwara et al.

[11] Patent Number: 5,186,970
[45] Date of Patent: Feb. 16, 1993

[54] FOOD FORMING METHOD

[75] Inventors: Hiroshi Ogiwara, Tokyo; Tatuya Miyata, Minoo; Akihiro Oda, Tomioka, all of Japan

[73] Assignee: Yugenkaisha Matsubei, Tokyo, Japan

[21] Appl. No.: 724,977

[22] Filed: Jun. 28, 1991

[30] Foreign Application Priority Data

Jul. 9, 1990 [JP] Japan ................... 2-181281

[51] Int. Cl.$^5$ ............................................. A23P 1/00
[52] U.S. Cl. ..................................... 426/512; 426/513; 426/514; 426/516; 426/517
[58] Field of Search ............... 426/512, 514, 515, 516, 426/517, 486, 506, 513; 425/584; 99/472; 141/59, 67; 264/102; 34/92

[56] References Cited

U.S. PATENT DOCUMENTS

| | | | |
|---|---|---|---|
| 2,933,785 | 4/1960 | Hansberg | 141/59 |
| 3,420,925 | 1/1969 | Sharif | 264/102 |
| 3,619,204 | 11/1971 | Katz | 426/516 |
| 3,650,766 | 3/1972 | Smadar | 426/516 |
| 4,339,468 | 7/1982 | Kielsmeier | 426/506 |
| 4,574,495 | 3/1986 | Brander | 34/92 |
| 4,786,243 | 11/1988 | Kohoe | 426/517 |

FOREIGN PATENT DOCUMENTS 304931 9/1971 U.S.S.R. .................... 426/512

Primary Examiner—George Yeung
Attorney, Agent, or Firm—Frishauf, Holtz, Goodman & Woodward

[57] ABSTRACT

A food forming method comprising forcing a food material through a die of a forming apparatus to form said food material into any one of a linear product, a sheet, a pipe or tube and a ring, wherein a zone external to said die is evacuated to a reduced pressure so that said food material is drawn out by suction.

A food forming apparatus that carries out the method is also disclosed, which comprises a food extrusion zone to an extrusion end of which a die having an orifice shaped corresponding to the shape of a final food product is fitted, and a suction chamber which encloses the outside of said die and whose inside is evacuated to a reduced pressure by a vacuum means.

12 Claims, 3 Drawing Sheets

FOOD FORMING METHOD

FIELD OF THE INVENTION

The present invention relates to a food forming method and a food forming apparatus, that forms a food material into a linear product, a sheet, a pipe or tube or the like by forcing the food material through a die of a forming apparatus, where a suction force is utilized as an auxiliary means.

BACKGROUND OF THE INVENTION

As apparatus for forming or shaping food to produce kamaboko (boiled fish paste), sausage, expanded cake, etc., extruders are widely used which thrust and press forward food materials by means of a screw, a pump or the like to extrude the food materials into shapes, from an orifice of a die provided at an extrusion end. In such extruders, the shape of the die orifice may be changed, whereby the food materials can be made into various shapes such as plates, columns, cylinders, etc.

A Japanese food konnyaku or konjak noodles are produced by extruding a konjak paste from a die provided with a number of orifices so as to be formed into noodles, and then immersing the formed or shaped product in hot water to thermally solidify it to a final product.

Thus, the conventional food extruders are all based on the principle that a pressure is applied to food materials in the interior of an apparatus so that the food materials are extruded from the die orifice into shapes.

Since, however, in such conventional food extruders a food material is thrust or pressed out of a die by the action of internally applied pressure, the food material, once thrust out, has a larger diameter than the orifice diameter of the die. For example, in the case where the food material is extruded into linear shapes, they each usually have, though depending on the degree of pressure, a diameter of about twice the orifice diameter of the die. If on the other hand the orifice diameter of the die is made small so that the resulting linear food products can have a small line diameter, clogging tends to occur and also the forming efficiency is lowered. Thus, it has been difficult to form food materials into very thin linear products or into very thin sheets by the use of the extruders.

SUMMARY OF THE INVENTION

The present invention was made taking account of the above problems. An object of the present invention is to provide a method, and an apparatus, capable of forming a food material into a very thin linear product, or into a sheet, pipe, tube, ring or the like having a very small sheet or wall thickness.

To achieve the above objects, a first embodiment of the food forming method of the present invention is characterized by a method of forming a food material into any one of a linear product, a sheet, a pipe or tube and a ring by forcing the food material through a die of a forming apparatus, wherein a zone external to said die is evacuated to a reduced pressure so that said food material is drawn out by suction.

A second embodiment of the food forming method of the present invention is characterized by a method of forming a food material into any one of a linear product, a sheet, a pipe or tube and a ring by forcing the food material through a die of a forming apparatus, wherein a pressure is applied to said food material in a food material feed zone of said forming apparatus and at the same time a zone external to said die is evacuated to a reduced pressure so that said food material is forced through said die (i.e., extruded and at the same time drawn out by suction).

A third embodiment of the food forming method of the present invention is characterized by a method of forming a food material into any one of a linear product, a sheet, a pipe or tube and a ring by forcing the food material through a die of a forming apparatus, wherein said food material is deaerated before it is fed to said forming apparatus, and a zone external to said die is evacuated to a reduced pressure so that said food material is drawn out by suction.

A fourth embodiment of the food forming method of the present invention is characterized by a method of forming a food material into any one of a linear product, a sheet, a pipe or tube and a ring by forcing the food material through a die of a forming apparatus, wherein said food material is deaerated before it is fed to said forming apparatus, and a pressure is applied to said food material in a food material feed zone of said forming apparatus and at the same time a zone external to said die is evacuated to a reduced pressure so that said food material is forced through said die (i.e., extruded and at the same time drawn out by suction).

In these embodiments of the method of the present invention, the food material having been drawn out may preferably be taken out after its immersion in a liquid.

There are no particular limitations on the food material. It can be exemplified by any one selected from minced fish, konjak paste, soy bean protein paste, meet paste, gelatin, chocolate material paste, candy materials, and cream.

A first embodiment of the food forming apparatus of the present invention is characterized by a food forming apparatus comprising;

a food extrusion zone extending to an extrusion end at which a die having an orifice shape corresponding to the shape of a final food product is fitted; and a suction chamber which encloses the outside of said die and whose inside is evacuated to a reduced pressure by a vacuum means.

A second embodiment of the food forming apparatus of the present invention is characterized by a food forming apparatus comprising;

a food extrusion zone extending to an extrusion end at which a die having an orifice shape corresponding to the shape of a final food product is fitted;

a pressurizing feed means that feeds a food material to said extrusion zone and applies a pressure to the food material; and a suction chamber which encloses the outside of said die and whose inside is evacuated to a reduced pressure by a vacuum means.

A third embodiment of the food forming apparatus of the present invention is characterized by a food forming apparatus comprising;

a food extrusion zone extending to an extrusion end at which a die having an orifice shape corresponding to the shape of a final food product is fitted;

a suction chamber which encloses the outside of said die and whose bottom is open;

a liquid tank disposed beneath said suction chamber and whose bottom surface is defined by its liquid surface to form a closed space therein; and a vacuum means for evacuating to a reduced pressure the closed space defined by said suction chamber and said liquid surface;

said food material being drawn out from said die and then immersed in the liquid as it is.

A fourth embodiment of the food forming apparatus of the present invention is characterized by a food forming apparatus comprising;

a food extrusion zone extending to an extrusion end at which a die having an orifice shape corresponding to the shape of a final food product is fitted;

a pressurizing feed means that feeds a food material to said extrusion zone and applies a pressure to the food material;

a suction chamber which encloses the outside of said die and whose bottom is open;

a liquid tank disposed beneath said suction chamber and whose bottom surface is defined by its liquid surface to form a closed space therein; and a vacuum means for evacuating to a reduced pressure the closed space defined by said suction chamber and said liquid surface;

said food material being drawn out from said die and then immersed in the liquid as it is.

In the third and fourth embodiments of the food forming apparatus, the apparatus may preferably be provided with a conveyor for carrying the shaped food product from the inside to the outside of said liquid tank.

In this way, in the present invention, the food material is drawn out by utilizing a suction force as an auxiliary means. Hence, when the food material is forced through the die, the possibility that the diameter or thickness of an extruded material becomes larger than the orifice diameter or slit width of the die can be relatively reduced. This makes it possible to produce a linear food product with a line diameter of as small as 3 mm or less or a thin sheet-like food product with a thickness of 3 mm or less, without making smaller the orifice diameter or slit width of the die to lower forming efficiency. In the food forming method of the present invention, the line diameter or sheet thickness of the food products shaped may preferably be 3 mm or less, and more preferably be 2 mm or less.

In the third and fourth embodiments of the food forming method of the present invention, the food material is previously deaerated and then fed to the forming apparatus. Thus, the food material can be prevented from being expanded when forced through the die. This makes it easy to produce a food product with a smaller line diameter or smaller sheet or wall thickness.

Moreover, when in a preferred embodiment of the present invention the food material is forced through the die, immersed in a liquid as it is, and then taken out by means of a conveyor or the like, the shaped food product can be taken out without deformation. This makes it easy to automate a food forming process.

In such an embodiment, the above liquid may be any of those appropriately selected from hot water, an aqueous alkali solution, heated edible oil for frying, etc., according to the types of food products. For example, when the food material is minced fish, the shaped food product may be immersed in hot water and thereby be caused to solidify to produce kamaboko. When the food material is a konjak paste, the shaped food product may be immersed in an aqueous alkali solution and thereby be caused to solidify to produce konjak. When the food material is soy bean paste, the shaped food product may be immersed in heated frying oil to produce abura-age (fried bean curd).

The solidification carried out after the food material has been made into shapes may not be limited to the methods described above. For example, a heating means such as a microwave heater may be provided at the part where the food material is forced through a die so that it can be caused to thermally solidify at the same time when it has been forced therethrough.

DESCRIPTION OF THE REFERRED EMBODIMENTS

Figure 1:
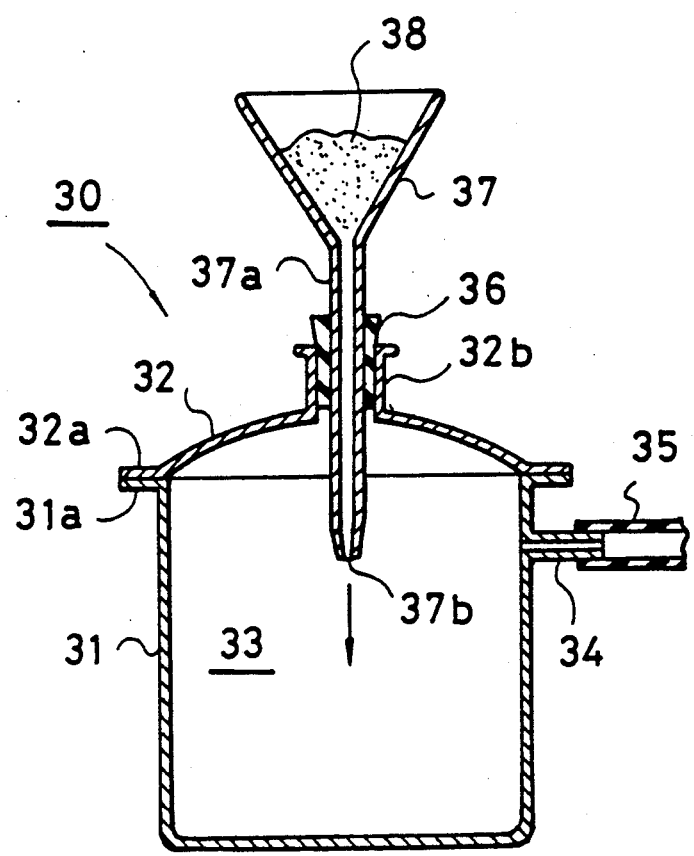
FIG. 1 is a cross section to illustrate an embodiment of the food forming apparatus of the present invention.

FIG. 1 illustrates an embodiment of the food forming apparatus of the present invention. This apparatus, denoted as 30, has a receptacle 31 and a cover 32. A flange 31a is formed on the peripheral edge of an upper open end of the receptacle 31. Another flange 32a is formed on the peripheral edge of the cover 32. The flanges 31a and 32a are so brought into close contact as to provide a hermetically closed suction chamber 33 in the interior. The receptacle 31 is provided on its peripheral wall with a pipe 34 that communicates with the suction chamber 33. A suction hose 35 is joined to the pipe 34. The suction hose 35 is connected with a vacuum means (not shown) as exemplified by a vacuum pump or an aspirator. A valve that controls the vacuum in the suction chamber 33 and its release is provided between the suction hose 35 and the vacuum means.

The cover 32 has a port 32b. To this port 32b, a guide tube 37a of a hopper 37 is inserted, being held by a rubber packing 36. A lower end portion of the guide tube 37a extends to the interior of the suction chamber 33, and a small orifice is made at its lowermost end. This orifice 37b substantially constitutes the die referred to in the present invention.

In this food forming apparatus 30 thus constructed, a food material is put in the hopper 37 and the air in the suction chamber 33 is sucked through the hose 5 to give a vacuum, so that the food material is drawn out in a linear form from the orifice 37b of the guide tube 37a of the hopper. In an experiment actually carried out, minced fish, a raw material of kamaboko, was used as the food material, and the suction chamber 33 was evacuated to a reduced pressure of about 700 to 200 mmHg. As a result, the minced fish was drawn out in the form of a thin line. In this instance, it was also possible to draw out the minced fish even when the orifice 37b of the guide tube 37a of the hopper was made to have a diameter of 2 mm or less. When a minced fish material having been deaerated was used as the minced fish, the expansion that may occur after it has been forced out was effectively restrained, and hence a product with a smaller line diameter was obtainable. After the food material was drawn out into a linear shape in this way, the valve was opened to release the vacuum inside the suction chamber 33, and the cover 32 was removed.

Thus it was possible to take out the shaped product from the suction chamber 33.

Figure 2:
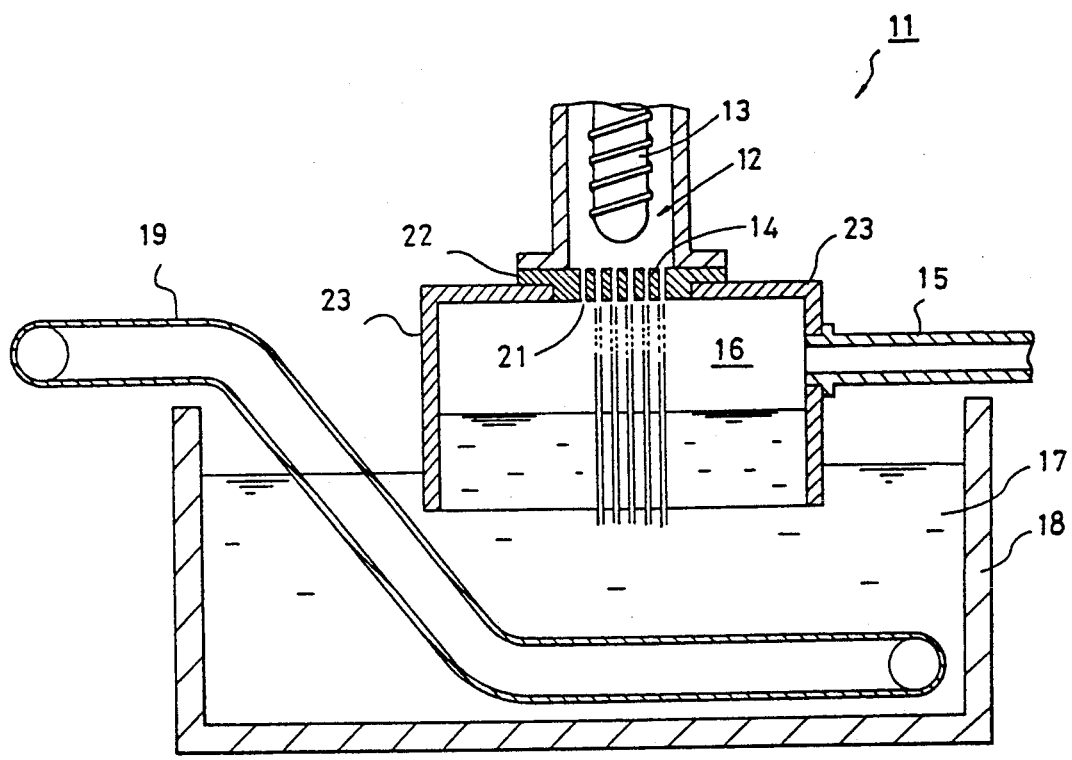
FIG. 2 is a cross section to illustrate another embodiment of the food forming apparatus of the present invention.

FIG. 2 illustrates another embodiment of the food forming apparatus of the present invention.

This food forming apparatus, denoted as 11, has an extrusion zone 12 from which a food material is fed out, which communicates with the body of the apparatus whose full illustration is omitted in the drawing. This extrusion zone 12 is provided in its inside with a screw 13 by which the food material is thrust forward to an end of the extrusion zone. A die having a number of orifices or slits is disposed at the end of the extrusion zone. In this embodiment, a number of orifices are made in the die. The screw 13 is rotated by means of a drive mechanism (not shown).

The die 14 has a flange 22 on its periphery, and is joined to the end of the extrusion zone 12 through this flange 22. A casing 23 with its top closed and bottom open is disposed at a lower part of the die 14. The die 14 is inserted to a fitting port made in the top surface of the casing 23, and its flange 22 is secured to the top surface of the casing 23. A suction pipe 15 connected to a vacuum means (not shown) such as a suction pump or the like is further joined to the side wall of the casing 23.

A liquid tank 18 holding a liquid 17 is disposed beneath the casing 23. The open bottom end of the casing 23 is immersed in this liquid 17 to form a closed space that provides a suction chamber 16 defined by the casing 23 and the surface of the liquid 17. This suction chamber 16 is provided with a vacuum by sucking the air inside suction chamber 16 through the suction pipe 15.

A conveyor 19 that extends from the inside of the liquid tank 18 to the outside of the liquid tank 18 is disposed so that any food products made into shapes can be carried outside.

The liquid 17 may preferably be a liquid capable of solidifying a shaped food material immersed therein. It may be appropriately selected according to the types of food products. For example, hot water, room temperature water, cold water, and heated edible oil can be used. A heater or the like may be fitted to the liquid tank 18 so that the liquid 17 can be heated to any desired temperatures.

A food forming method of the present invention in which the food material is made into shapes using this apparatus will be described below.

First, the food material that can be made into shapes using the apparatus of the present invention may preferably be a material capable of being solidified when immersed in the liquid such as hot water, room temperature water, cold water or high-temperature edible oil. For example, it is possible to use minced fish, konjak paste, soy bean protein paste, meat paste, gelatin, chocolate material paste, candy materials, and cream.

The minced fish can be prepared, for example, by adding 2 to 4% by weight of sodium chloride to raw fish of Alaska pollacks, croaker, sharks, bastard halibuts, Atka mackerels, or mince produced from any of these, optionally further adding thereto auxiliary materials such as starch, sodium glutamate, glycine, sugar, protein and fats and oils, and kneading them by means of a stirrer or the like.

The konjak paste can be prepared, for example, by making a tuberous root of a devil's tongue or a powdery product thereof into konjak starch by a conventional method, and adding to this konjak starch an alkali such as calcium hydroxide (lime), calcium carbonate or sodium hydrogencarbonate, followed by mixing. The alkali, however, need not be added to the konjak paste when an alkali is added in the liquid 17 in the tank 18.

As the soy bean paste, it is possible to use, for example, a paste prepared by mixing soy bean protein, vegetable oil and water, or mashed bean curd.

The meat paste can be prepared, for example, like the preparation of sausage, etc., by adding seasoning, spice, etc. to minced meat followed by mixing.

Other gelatin, chocolate material paste, candy materials, cream, etc. can also be prepared by conventionally known methods.

These food materials are each fed to a hopper (not shown) or to the main body of the food forming apparatus through a feed pipe, and sent downward to an end of the extrusion zone 12 as the screw is rotated. Alternatively, the food material may be fed to the end of the extrusion zone 12 by means of a pump or the like. In instances in which the food material has a low viscosity and can be readily sent downward to the end of the extrusion zone 12 by the action of gravity, the screw 13 or the pump need not be provided.

The pressure applied to the food material by means of the screw 13, the pump or the like should be of a force sufficient for the food material to move toward the end of the extrusion zone 12, and may vary depending on the types of food materials, the structure of the extrusion zone 12, etc. It should preferably be 0 to about 5 $kg/cm^2$.

In the state that the food material has reached the end of the extrusion zone 12, the air is sucked through the suction pipe 15 by means of a vacuum device (not shown) to evacuate the suction chamber 16 to a reduced pressure of preferably about 700 to 200 mmHg, so that the food material is drawn out from orifices 21 of the die 14 by suction, into linear shapes in the case of this embodiment.

The food material made into linear shapes in this way falls in the liquid 17 in the liquid tank 18, and, for example, thermally solidifies while it is immersed in the liquid. A food product of linear shapes is thus obtained. The food product thus obtained is carried to the outside of the liquid tank 18 by means of the conveyor 19, and optionally cut into final products. When the shape of the orifice 21 of the die is changed to a slit, a sheet-like food product can be produced in the same way. The shape of the die may also be changed, whereby it also becomes possible to obtain a food product having an end view as shown in FIG. 3.

Figure 3:
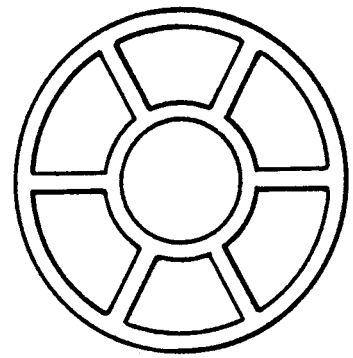
FIG. 3 is an end view of an example of a food product obtained according to the present invention.
Figure 4:
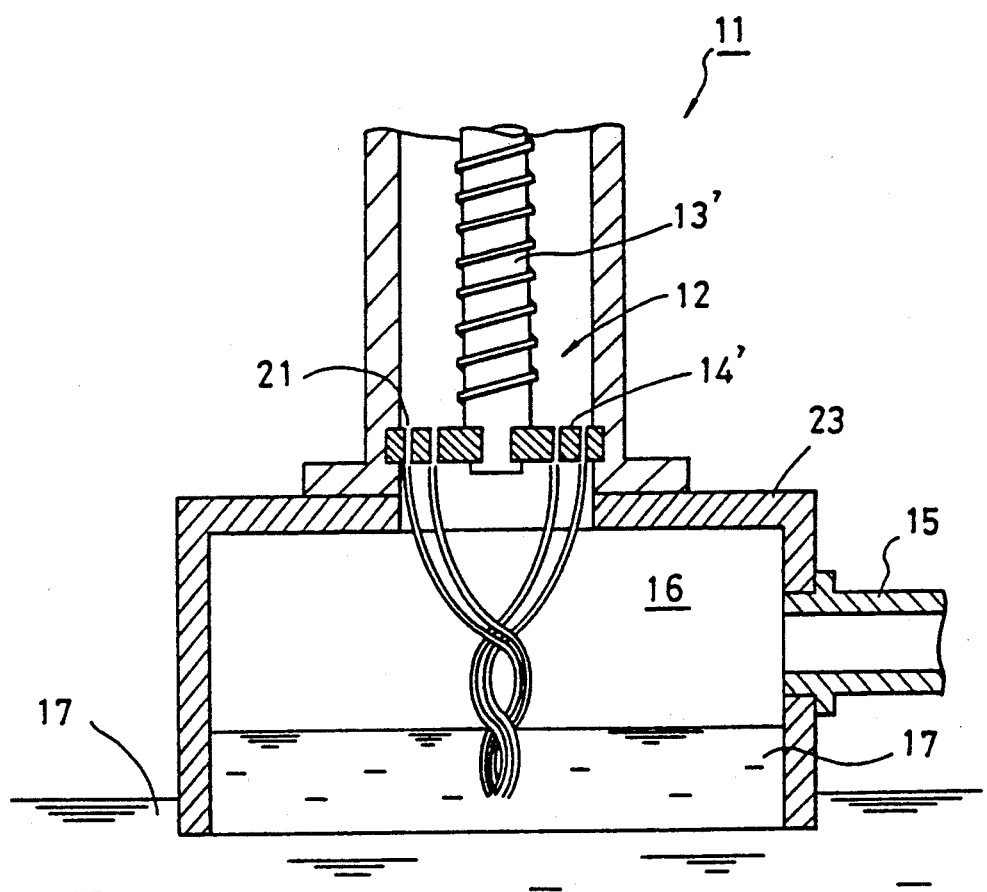
FIG. 4 is a partial cross section to illustrate still another embodiment of the food forming apparatus of the present invention.

FIG. 4 illustrates still another embodiment of the food forming apparatus according to the present invention. In FIG. 4, the same numerals are used to denote substantially the same components as those in the forming apparatus shown in FIG. 3. Description thereof is thus omitted.

This food forming apparatus 11 is constructed in substantially the same fashion as the apparatus shown in FIG. 3, except that an end of a screw 13' is joined to the center of a die 14' in such a way that the die 14' can be rotatably supported. Thus, in this forming apparatus, the food material is forced through the die while the die 14' is rotated together with the screw 13', so that it is possible to twist and entangle a product in which the food material has been made into linear shapes The present invention will be described below in greater detail by giving Examples.

EXAMPLE 1

To 100 g of konjak powder, 3 lit. of water was added to cause the powder to swell. Thereafter, 3 g of lime was dispersed in 100 ml of water, and the resulting dispersion was added to the swelled product followed by mixing. A konjak paste was thus prepared.

To the food forming apparatus shown in FIG. 2, a die 14 with a number of orifices each having a diameter of 1 mm was fitted. After hot water of 75° C. was poured into the liquid tank 18, the above konjak paste was fed to the extrusion zone 12 by means of the screw 13 under application of a pressure of 1 kg/cm$^2$, in a state where the suction chamber 16 was evacuated to a reduced pressure of 400 mmHg. The konjak paste was extruded from the orifices of the die 14 and at the same time drawn out therefrom to the suction chamber 16 by suction, where it was formed into noodles. The noodle-like products fell in the hot water and solidified in the hot water. The conveyor 19 was operated to carry the solidified konjak products to the outside of the liquid tank 18, which were then cut at intervals of 20 cm in length to give konjak noodles.

The resulting konjak noodles were 1 mm to 1.33 mm in diameters, which were substantially the same as the diameters of the orifices provided in the die 14. Thus, slender konjak noodles were obtained.

EXAMPLE 2

A sheet-like konjak was produced under the same conditions as in Example 1 except that the die having a number of orifices used therein was replaced with a die having a slit of 1 mm in width and 30 mm in length.

The konjak thus obtained was drawn out into a sheet having substantially the same width and length as those of the slit. Thus, a very thin sheet-like konjak was obtained.

EXAMPLE 3

1,000 g of salt-free mince of Alaska pollack, 30 g of sodium chloride, 30 g of mirin (sweet sake for seasoning), 50 g of starch, 5 g of sodium glutamate, 30 g of sugar and 300 g of water were mixed, stirred and kneaded, further followed by deaeration to give minced fish.

Using the forming apparatus shown in FIG. 4, hot water of 25° C. was poured as the liquid 17. The die 14' was made to have a number of orifices of 2 mm in diameter each.

After the suction chamber 16 was evacuated to a reduced pressure of 380 mmHg, the above minced fish was fed to the extrusion zone 12 under application of a pressure of 1 kg/cm$^2$ while the die 14' was rotated. The minced fish was forced through the orifices of the die 14' into linear shapes and at the same time brought into a form wherein the linear shapes were twisted and entangled with one another, which then fell in the hot water to thermally solidify. The fish paste having solidified was carried to the outside of the liquid tank 18 by means of the conveyor 19. Thus a fish paste wherein thin linear shapes were entangled in a spiral form was obtained.

The fish paste thus obtained was in the state that linear shapes with a line diameter of 2.3 mm each were in a bundle, and the diameter was substantially the same as the diameter of each orifice of the die 14'.

What is claimed is:

1. A food forming method comprising the steps of:
    forcing a food material through a die of a forming apparatus to form said food material into a linear product,
    deaerating said food material before it is fed to said forming apparatus, and
    drawing out said food material by suction from said die by evacuating a zone external to said die with a reduced pressure.

2. The food forming method according to claim 1, wherein said food material is a food material selected from the group consisting of minced fish, konjak paste, soy bean protein paste, meat paste and gelatin.

3. The food forming method according to claim 1, wherein said linear product has a shape selected from the group consisting of a line, a sheet, a tube and a ring.

4. A food forming method comprising the steps of:
    forcing a food material through a die of a forming apparatus to form said food material into a linear product,
    deaerating said food material before it is fed to said forming apparatus,
    drawing out said food material by suction from said die by evacuating a zone external to said die,
    solidifying said food material by directly immersing said food material in a liquid, and
    then removing said immersed food material from said liquid.

5. The food forming method according to claim 4, wherein said food material is a food material selected from the group consisting of minced fish, konjak paste, soy bean protein paste, meat paste and gelatin.

6. The food forming method according to claim 4, wherein said linear product has a shape selected from the group consisting of a line, a sheet, a tube and a ring.

7. A food forming method comprising the steps of:
    forcing a food material through a die of a forming apparatus to form said food material into a linear product,
    deaerating said food material before it is fed to said forming apparatus, and
    forcing said food material through said die by applying a pressure to said food material in a food material feed zone of said forming apparatus and at the same time by evacuating a zone external to said die with a reduced pressure.

8. The food forming method accoding to claim 7, wherein said food material is a food material selected from the group consisting of minced fish, konjak paste, soy bean protein paste, meat paste and gelatin.

9. The food forming method according to claim 8, wherein said linear product has a shape selected from the group consisting of a line, a sheet, a tube and a ring.

10. A food forming method comprising the steps of:
    forcing a food material through a die of a forming apparatus to form said food material into a linear product,
    deaerating said food material before it is fed to said forming apparatus,
    forcing said food material through said die by applying a pressure to said food material in a food material feed zone of said forming apparatus and at the same time by evacuating a zone external to said die with a reduced pressure,
    solidifying said food material by directly immersing said food material in a liquid, and
    then removing said immersed food material from said liquid.

11. The food forming method according to claim 10, wherein said food material is a food material selected from the group consisting of minced fish, konjak paste, soy bean protein paste, meat paste and gelatin.

12. The food forming method according to claim 10, wherein said linear product has a shape selected from the group consisting of a line, a sheet, a tube and a ring.

* * * * *